United States Patent [19]

Sermersheim et al.

[11] Patent Number: 4,500,303

[45] Date of Patent: Feb. 19, 1985

[54] IDLER MECHANISM

[75] Inventors: DeWayne T. Sermersheim; Jack L. Baxter, both of Columbus, Ind.

[73] Assignee: Cummins Engine Company, Inc., Columbus, Ind.

[21] Appl. No.: 336,333

[22] Filed: Dec. 31, 1981

[51] Int. Cl.³ .......................... F16H 7/10; F16H 7/12
[52] U.S. Cl. .................................... 474/112; 474/133; 474/135; 474/117
[58] Field of Search ............... 474/111, 112, 113, 133, 474/134, 135, 117

[56] References Cited

U.S. PATENT DOCUMENTS

| Re. 30,842 | 1/1982 | Speer | 474/135 |
|---|---|---|---|
| 660,570 | 10/1900 | Green | 474/135 |
| 3,358,521 | 12/1967 | Browning, Jr. | 474/133 |
| 3,701,980 | 1/1963 | Brewer | 365/188 |
| 3,817,113 | 6/1974 | Pfarrwaller | 474/134 |
| 3,950,046 | 4/1976 | Lubbersmeyer | 308/190 |
| 4,144,772 | 3/1979 | Brackin et al. | 474/135 |

FOREIGN PATENT DOCUMENTS 2902182  7/1980  Fed. Rep. of Germany ...... 474/133

Primary Examiner—Lawrence J. Staab
Assistant Examiner—Michael D. Bednarek
Attorney, Agent, or Firm—Sixbey, Friedman & Leedom

[57] ABSTRACT

An idler mechanism for maintaining tension on a drive belt in a drive belt system comprising an idler arm, a pulley mounted on the arm for rotation about a rotational axis, a pivotally adjustable mounting plate, means pivotally mounting the arm to the mounting plate eccentrically with respect to the pivot axis of the plate, and resilient means operatively associated with the pivotal mounting means for resiliently biasing the pulley into tensioning engagement with the drive belt. Application of a predetermined input torque to the pivot axis of the adjustable plate imparts a substantially constant tension to the drive belt substantially independent of belt length within predetermined tolerances.

14 Claims, 5 Drawing Figures

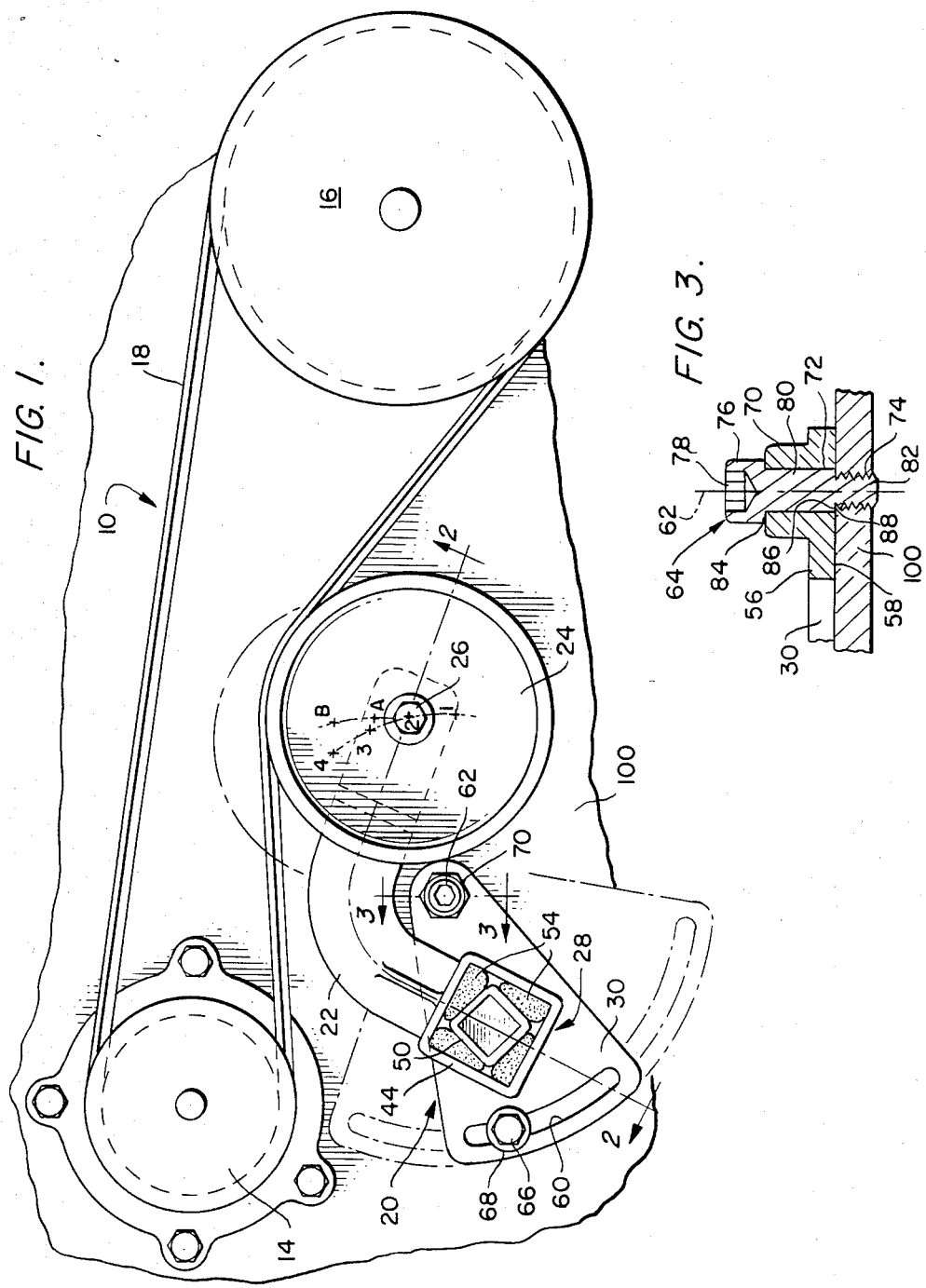

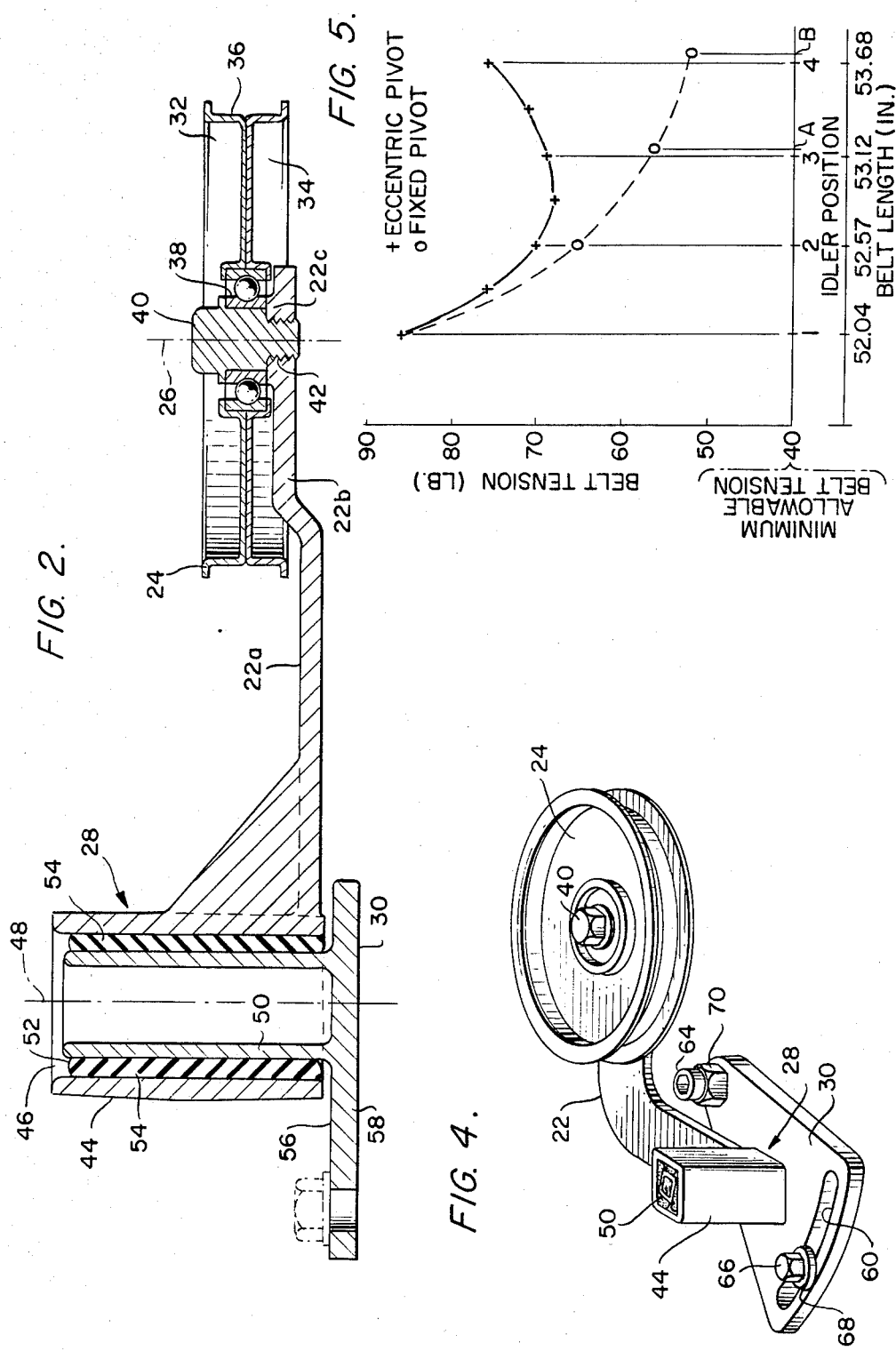

IDLER MECHANISM

DESCRIPTION

1. Technical Field

The present invention relates to drive belt tensioning systems and, more particularly, to an idler mechanism for use in a belt drive tensioning system.

2. Background Art

Belt drive systems are widely and conventionally used in various applications to transmit power between a power source and a device to be driven. Typical of such a use is the conventional belt drive system employed on engines of various types to transmit power between an engine operated accessory drive and a driven accessory, such as a water pump, etc. Belt drive systems generally include a driving pulley, associated with the accessory drive, and at least one driven pulley, associated with the accessory, connected by an endless belt that transmits the rotation of the driving pulley to the driven pulley. To operate most efficiently and with minimum belt wear the tension of the belt must be periodically adjusted to an optimum tension range sufficiently high to efficiently transmit power without excessively stretching and wearing the belt. To accomplish this belt tensioning it has become common to utilize idler mechanisms comprising an idler pulley positioned between the driving and driven pulleys to engage and apply tension to the drive belt. The more sophisticated idler mechanisms employ a tensioning idler pulley which is resiliently biased into tensioning engagement with the drive belt. By resiliently biasing the idler pulley many shortcomings associated with rigidly mounted idler mechanisms are overcome and the mechanism is better able to compensate for many operational variations which affect belt tension, such as variations in load and belt wear.

U.S. Pat. No. 4,144,772 to Brackin et al discloses an arm supported idler pulley wherein the arm is pivotable on and resiliently connected to, using a block of elastomeric material, a rigidly secured and fixedly positioned mounting assembly therefor. Notwithstanding the resilient mounting, it has been found that the tension imparted to the drive belt by the idler pulley is directly related to drive belt length and, to achieve optimum drive belt tensioning by repositioning the idler pulley requires monitoring of belt tension.

U.S. Pat. No. 3,071,980 to Brewer exemplifies an idler pulley which is non-resiliently mounted on an arm rotatably supported on a pivotable base. The pulley is repositionable to impart a desired tension to the drive belt by rotation of the mounting arm and pivotal shifting of the base. However, the idler mechanism arrangement disclosed in this patent has the dual disadvantages that it requires a multistep procedure to accurately reposition the idler pulley to retension the drive belt and, due to varying drive belt lengths, such repositioning requires monitoring of the drive belt tension to know when the pulley is in optimum position.

Therefore, at least one very significant disadvantage of known idler mechanisms is that the idler mechanism adjustment necessary to optimally tension or retension drive belts varies widely with drive belt length. As is well known, even new drive belts vary in length within certain tolerances and, in use, drive belts stretch with an attendant drop in belt tension. Therefore, using known idler mechanisms, each time a belt requires tensioning it becomes necessary to monitor the actual tension in the belt as the idler mechanism is adjusted to know when the optimum tension is reached. Such a requirement is unrealistic and impactical and rather than actually monitor belt tension each time, known idler mechanisms are adjusted in a manner which insures at least a minimum acceptable tension in the belts. The practical effect of this practice is to consistently over-tension drive belts. This is very undesirable since unnecessarily high belt tension requires the use of heavy duty bearings in the accessory drive and increases wear on and thus shortens the useful life of the drive belt. Therefore, to avoid this over-tensioning practice a need exists for an idler mechanism which is capable of establishing substantially optimum tension in the drive belt without need to monitor belt tension during idler pulley repositioning.

DISCLOSURE OF THE INVENTION

In one aspect of the present invention this is accomplished by providing, in a belt drive system, an idler mechanism capable of tensioning a drive belt to a substantially optimum tension range without monitoring belt tension by application of a constant input torque.

In another aspect of the invention an idler mechanism capable of tensioning a drive belt to a substantially optimum tension range is provided which includes an idler pulley resiliently biased into tensioning engagement with the drive belt and a pivotable support arm for the pulley mounted on a pivotally adjustable plate, the pivot axis of the support arm being offset from the pivot axis of the plate to eccentrically mount the arm with respect to the pivot axis of the plate.

In a particularly preferred form of the invention the idler mechanism of the present invention comprises an idler arm, a pulley mounted on the arm for rotation about a rotational axis, a pivotally adjustable mounting plate, means pivotally mounting the arm to the mounting plate eccentrically with respect to the pivot axis of the plate, and resilient means operatively associated with the pivotal mounting means for resiliently biasing the pulley into tensioning engagement with the drive belt, whereby application of a predetermined input torque to the pivot axis of the adjustable plate imparts a substantially constant tension to the drive belt substantially independent of belt length within predetermined tolerances.

BRIEF DESCRIPTION OF THE DRAWINGS

FIG. 1 is a top plan view of a typical belt drive system showing the idler mechanism of the present invention in tensioning engagement with the drive belt.

FIG. 2 is a sectional view taken substantially along line 2—2 in FIG. 1.

FIG. 3 is a sectional view taken substantially along line 3—3 in FIG. 1.

FIG. 4 is a perspective view of a specific embodiment of the idler mechanism of the present invention.

FIG. 5 is a graphical representation showing the relationship between drive belt tension and idler pulley position or drive belt length for the idler mechanism of the present invention.

BEST MODE FOR CARRYING OUT THE INVENTION

Referring to the drawings, FIG. 1 illustrates an engine accessory drive, designated generally as 10, that incorporates the idler mechanism of the present invention. It should be understood that although the idler mechanism of the present invention is disclosed herein in connection with accessory drive 10, the idler mechanism has equal applicability in other belt drive systems.

An engine accessory, herein illustrated as water pump 12, is driven by a belt drive system that includes driven pulley 14 operatively attached to the water pump drive shaft to impart rotational motion thereto. The belt drive system also includes a driving power source which is connected via power take off means (not shown) to the engine. Power is transmitted from driving pulley 16 of the driving power source to driven pulley 14 by an endless drive belt 18. Endless belt 18 is conventional in all respects and exhibits good frictional characteristics and adequate resiliency. As in all belt drive systems, to achieve efficient power transmission from driving pulley 16 to driven pulley 14, endless belt 18 must be maintained under suitable tension. In conventional manner the endless belt 18 is tensioned by an idler mechanism 20 comprising an idler arm 22 having an idler pulley 24 mounted thereon for rotation about a rotational axis 26. Mounting means 28, described more fully hereinafter, pivotally mounts arm 22 on a pivotally adjustable mounting plate 30 which is itself mounted to the engine housing 100. Pulley 24 is resiliently biased into contact with belt 18 to provide the desired tension therein in a manner to be described more fully hereinafter.

The structure of the idler mechanism 20 of the present invention can be seen in greater detail from a consideration of FIGS. 2-4 in conjunction with FIG. 1. Pulley 24 includes a pair of pulley halves 32 and 34 that are secured back-to-back to define a generally concave annular groove 36 in which belt 18 is received. Pulley halves 32 and 34 may be fastened together in any convenient fashion such as by welding or riveting. In the embodiment shown, a bearing member 38 is centrally captivated in pulley 24 between the halves by stud member 40 which extends through centrally aligned apertures in pulley halves 32 and 34 and bearing member 38 and is threadedly received within aperture 42 in arm 22 for mounting pulley 24 thereon.

Arm 22, in the embodiment shown, comprises an end portion 22a affixed to mounting means 28 and an offset end portion 22b having a boss 22c on which pulley 24 is mounted. Offset end portion 22b and boss 22c extend generally axially inward of and are substantially housed within the recessed outer surface of pulley half 34. Mounting means 28 includes a tubular socket member 44 which is preferably square in cross-section, as shown in FIG. 1, defining preferably square tubular passageway 46, and to which arm end portion 22a is affixed. The central axis 48 of passageway 46 is the pivotal axis of arm 22 and is aligned generally parallel to the rotational axis 26 of pulley 24. Axially received within square tubular passage 46 is a generally square tubular sleeve member 50 which is rigidly affixed at one end, as by welding, to adjustable mounting plate 30 with the sleeve central axis substantially normal to plate 30. The outer surface of sleeve member 50 defines with the inner surface of passageway 46 an annular space 52 in which is received a plurality, preferably four, of generally elongated rod shaped sections of resilient elastomeric material 54 which may, for example, be any suitably resilient natural or synthetic rubber. Rods 54 are inserted within annular space 52 in the axially extending spaces defined between the opposite side walls of socket member 44 and sleeve member 50. Rods 54 have cross sectional dimensions before insertion somewhat greater than the dimensions of the spaces such that rods 54 are held within annular space 52 in a tight compressive engagement. As can be seen in FIG. 1, with rods 54 installed, sleeve member 50 is arranged substantially coaxially within socket member 44 and the members 50, 44 are relatively rotatable with respect to each other.

Mounting plate 30 is generally triangular having a top surface 56 and a bottom surface 58 and is pivotally supported along bottom surface 58 for adjustable pivotal movement on engine housing 100. Plate 30 is provided with an arcuate slot 60 disposed generally along one side of mounting plate 30. Slot 60 preferably corresponds to a circular arc having its radius extending from the pivotal axis 62 of plate 30, defined by pivot pin 64. An externally threaded bolt 66 projects outwardly from engine housing 100 and is received within arcuate slot 60. The head 68 of bolt 66 rigidly secures mounting plate 30 to engine housing 100 when the bolt 66 is tightened. Mounting plate 30 is pivotally adjustable about pivot pin 64 located in the apex angle of plate 30 generally opposite slot 60. Pivot pin 64 extends through integral upstanding torque collar 70 surrounding aperture 72 on mounting plate 30 and is threadedly received in coaxially aligned reduced diameter aperture 74 in engine housing 100. Pivot pin 64 includes a head portion 76, having a tool receiving recess 78 in the upper surface thereof, an axially extending intermediate shank portion 80 and an externally threaded reduced diameter end shank portion 82. Pivot pin 64 is received within collar 70 and apertures 72 and 74 with the annular shoulder 84 defined between head 76 and intermediate shank portion 80 facing the upper surfaces of collar 70, with intermediate shank portion 80 received within collar 70 and aperture 72 and with the annular shoulder 86 defined between intermediate and end shank portion 80,82 facing the annular shelf 88 defined between apertures 72 and 74. It will be appreciated that the axial lengths of end shank portion 82 and intermediate shank portion 80 may be selected to cause pivot pin 64 to function only as a pivot axis for mounting plate 30 or also to rigidly secure mounting plate 30 to engine housing 100. Thus, if the shank length between shoulders 84 and 86 is greater than the height of collar 70 above engine housing 100, pivot pin 64 serves only a pivoting function since shoulder 86 will seat upon shelf 88 before shoulder 84 can seat upon and firmly grip the upper surfaces of collar 70 to rigidly fix mounting plate 30 in place. On the other hand, if the shank length between shoulders 84 and 86 is less than the height of collar 70 above engine housing 100, then shoulder 84 will seat on the upper surfaces of collar 70 to rigidly fix mounting plate 30 in place before shoulder 86 seats on shelf 88.

INDUSTRIAL APPLICABILITY

The idler mechanism 20 of the present invention has wide applicability in various type belt drive systems and is particularly advantageous because the tension it imparts to a drive belt for a given torque input is substantially constant notwithstanding small variations in belt length. The manner in which this is accomplished with the idler mechanism of the present invention will appear more clearly from the following brief description of its manner of operation.

In operation, the drive belt system is configured as in FIG. 1 with pulley 24 adjusted to engage belt 18 and apply a tensioning force thereto. To adjust the tension in belt 18, bolt 66 and pivot pin 64 are loosened to permit pivotally adjustable movement of mounting plate 30 relative to engine housing 100. A suitable tool, such as a torque wrench, is utilized to grasp torque collar 70 and to apply thereto a predetermined input torque. Mounting plate 30 rotates about its pivotal axis 62 with bolt 66 sliding within arcuate slot 60 to a pivotal position resulting from the applied torque. Bolt 66 and pivot pin 64 are then retightened to fix mounting plate 30 in its new position. The applied input torque is transmitted via plate 30 through sleeve member 50, resilient rods 54 and socket member 44 to cause a pivotal repositioning of the pivot axis of arm 22 and pulley 24 relative to drive belt 18 which results in an increased tension in belt 18. The pivotal repositioning of arm 22 caused by pivotal repositioning of plate 30 with pulley 24 in tensioning engagement with drive belt 18 is accomplished by relative rotation of sleeve member 50 and socket member 44 causing deformation of resilient rods 54. The resiliency, i.e., elastic memory of rods 54, tends to bias arm 22 back to its pre-retensioned position and, in this manner, rods 54 function as an elastomeric spring in applying a tensioning force to pulley 46.

It has been found that the idler mechanism of the present invention advantageously improves over prior art resiliently biased idler mechanisms by virtue of the dual pivot arrangement whereby the initial tension in drive belt 18 is achieved during retensioning using eccentric pivot axis 62 whereas, following retensioning with mounting plate 30 fixed in position, pulley 46 is resiliently biased into tensioning engagement with drive belt 18 using pivot axis 48. This use of an eccentric pivot for retensioning allows attainment of a substantially constant initial belt tension substantially independent of belt length within predetermined tolerances, by application of a constant input torque. This feature is most important since it obviates the need to monitor belt tension during retensioning and eliminates any need for the practice of overtensioning to assure application of at least a minimum acceptable belt tension.

The advantages of the eccentric pivot, resiliently biased idler mechanism of the present invention will become more apparent, particularly when compared to prior art fixed pivot resiliently biased idler mechanisms, from the following illustrative example.

A drive belt system, as shown generally to scale in FIG. 1, was assembled utilizing a water pump driven pulley diameter of about 3.8 inches, a driving pulley diameter of about 7 inches, an idler pulley diameter of about 5.0 inches, an offset distance of about 2.7 inches between arm pivotal axis 48 and mounting plate pivotal axis 62 and a distance of about 6 inches between arm pivotal axis 48 and pulley rotational axis 26. The pivot axes of the various elements were positioned relative to one another as illustrated in FIG. 1. For this system, the optimum initial belt tension is 70 lbs. As the belt stretches during operation, the belt tension drops off until a minimum allowable tension of 40 lbs. is reached at which point the belt is retensioned to a tension as close as possible to the optimum initial belt tension by application of a constant input torque, determined to be 21.5 ft-lb. in the case of the illustrated system, at the eccentric pivot axis 62. This retensioning causes the idler pulley rotational axis to move along path 2-A-B, depending upon belt length, and can be repeated each time the belt stretches until the belt is worn beyond retensioning.

FIG. 5 illustrates on the solid line curve the relationship between initial belt tension and belt length (also shown as idler pulley rotational axis position on FIG. 1) for the eccentric pivot idler mechanism of the present invention when a constant input torque of 21.5 ft lb. is applied. It is noteworthy that the eccentric pivot idler mechanism maintains a substantially constant initial belt tension ranging between about 69–86 lbs. for belt lengths varying from about 52.04 to 53.68 inches. This initial belt tension is always substantially greater than the minimum allowable belt tension and, therefore, assures a relatively long useful operational period for the drive belt system between retensionings. This was compared with a conventional fixed pivot resiliently biased idler mechanism having substantially the same dimension except, of course, that the constant input torque of 21.5 ft.-lb. was applied directly at the fixed arm pivot to cause idler pulley rotational axis 26 to move along path 1-2-3-4, depending upon belt length, and there is no eccentric pivot. The dashed line curve in FIG. 5 illustrates the relationship between drive belt tension and belt length for the fixed pivot idler mechanism of the prior art. It is noteworthy that the initial belt tension constantly decreases with increasing belt length and is almost always less than the initial belt tension achieved by the eccentric pivot idler mechanism. Moreover, the difference between the initial belt tension achieved by the fixed pivot idler mechanism and the minimum allowable belt tension becomes quite small with increasing belt length. Therefore, the fixed pivot idler mechanism does not provide a substantially constant initial belt tension substantially independent of belt length and a system utilizing a fixed pivot idler mechanism would have to be retensioned many more times during the life of a belt than would a system utilizing the eccentric pivot idler mechanism.

We claim:

1. An idler mechanism for establishing and maintaining tension in a drive belt having a length which may be within a known tolerance range, with the belt being used in a belt drive system which includes at least one driving pulley and one driven pulley operatively interconnected by the drive belt, comprising:
    (a) pulley means having a pulley rotation axis;
    (b) pulley supporting means operating in both a retensioning mode and a fixed pivot axis mode for biasing said pulley means against the belt in response to application of a known belt tensioning force when said pulley supporting means is operating in a retension mode, by causing the pulley rotational axis to reside at a point along a predetermined retensioning arc which has no single fixed radius of curvature, said point being dependent upon the length of the belt within the known tolerance range and for continuing to apply a tensioning force to the belt when said pulley supporting means is operating in a fixed pivot axis mode by causing the pulley rotational axis to move along a second arcuate curve centered around a fixed axis, said pulley supporting means including
        (1) an idler arm supporting said pulley means;
        (2) resilient means for applying a biasing force to said idler arm;
        (3) pivot axis forming means supporting said idler arm for rotation about the fixed pivot axis defined by said pulley supporting means when operating in the fixed pivot axis mode; and
        (4) plate means attached to said pivot axis forming means for adjusting the position of said fixed pivot axis about a second pivot axis when said pulley supporting means is operating in the retensioning mode, said plate means having an aperture defined at said second pivot axis and including (i) fastening means located at said second pivot axis for holding said plate means in a fixed position during said fixed mode of operation and for permitting said plate means to pivot thereabout during the retensioning mode of operation, and (ii) a tubular torque receiving collar means integral with said plate means and extending outwardly from said plate means along said second pivot axis for receiving said fastening means, said torque receiving collar means having a bore and surrounding said aperture so said bore and said aperture are in cooperative association with each other for receiving said fastening means, said torque receiving collar means further including an end surface spaced from said plate means for engaging said fastening means to prevent said plate means from rotating about said second pivot axis during said fixed pivot axis mode of operation and for being spaced apart from said fastening means during said retensioning mode of operation, said torque receiving collar means further including a planar surface thereon which extends between said end surface and said plate means and which is adapted to be grasped by a torque tool, such as a standard torque wrench for imposing the known force about said second pivot axis during the retensioning mode of operation.

2. The idler mechanism as defined in claim 1 wherein the driven pulley has a diameter of about 3.8 inches, the driving pulley has a diameter of about 7 inches and said pulley means has a diameter of about 5 inches, and further wherein said fixed pivot axis is offset from said second pivot axis by a distance of about 2.7 inches and said pulley means rotational axis is about 6 inches from said fixed pivot axis.

3. The idler mechanism defined in claim 2 wherein belt length valves between 52.04 inches and 53.60 inches and belt tension force varies between 69 pounds and 86 pounds for an input torque of 21.5 ft.-lbs.

4. An idler mechanism, as claimed in claim 1, wherein said fixed pivot axis is arranged eccentrically with respect to said second pivot axis.

5. An idler mechanism, as claimed in claim 3, wherein said fixed and second pivot axes are substantially parallel.

6. An idler mechanism, as claimed in claim 5, wherein said pivot axis forming means is supported on said plate means with said first pivot axis extending substantially normal to said base means.

7. An idler mechanism, as claimed in claim 6, wherein said pivot axis forming means comprises an elongated tubular socket member, said idler arm is secured to said socket member, and said fixed pivot axis comprises the central axis of said socket member.

8. An idler mechanism, as claimed in claim 7, wherein said positioning means further includes an elongated sleeve member secured to said base means with its central axis substantially normal to said plate means, said sleeve member being received substantially coaxially within said socket member for relative rotation therebetween about said fixed pivot axis.

9. An idler mechanism, as claimed in claim 8, wherein said sleeve member and socket member define an axially extending annular space therebetween and said resilient means is disposed in said annular space.

10. An idler mechanism, as claimed in claim 9, wherein said resilient means comprises an elastomeric spring.

11. An idler mechanism, as claimed in claim 9, wherein said resilient means comprises a plurality of elastomeric rods.

12. An idler mechanism, as claimed in claim 11, wherein said sleeve and socket members are substantially square in cross section and said elastomeric rods are arranged in the axially extending spaces defined between opposite walls of said socket and sleeve members.

13. An idler mechanism, as claimed in claim 12, wherein said rods have cross-sectional dimensions greater than said spaces between said walls and said rods are maintained in compressive engagement with said walls within said annular space.

14. An idler mechanism, as claimed in claim 13, wherein said plate means has a generally circular arcuate slot adapted for slidably receiving fastening means therein, an aperture formed in said plate having a center corresponding to said second pivotal axis, said aperture adapted for receiving fulcrum defining means therein and arranged relative to said slot for guided pivotal adjustment of said plate means about said fulcrum defining means with said fastening means guidingly slidable in said slot.

* * * * *